May 30, 1939.　　K. MORSBACH ET AL　　2,159,998
FILM HOLDER FOR PHOTOGRAPHIC CAMERAS
Filed June 4, 1931
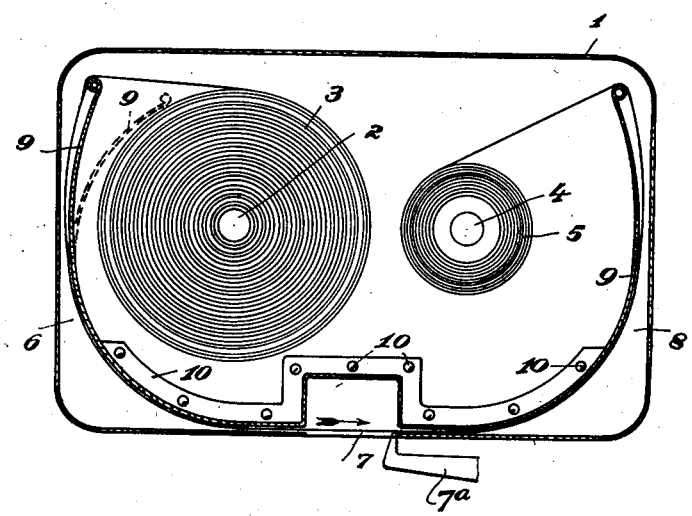
Inventors:
Kurt Morsbach
Kurt Raschke
by
Lorenz Kehlenback
Attorneys Patented May 30, 1939

2,159,998

UNITED STATES PATENT OFFICE 2,159,998

FILM HOLDER FOR PHOTOGRAPHIC CAMERAS

Kurt Morsbach, Berlin-Grunewald, and Kurt Raschke, Berlin, Germany, assignors, by mesne assignments, to Camera Patents Corporation, Ridgewood, N. J., a corporation of New Jersey Application June 4, 1931, Serial No. 542,034
In Germany August 26, 1930

9 Claims. (Cl. 88—17)

In a certain well-known type of photographic film cameras the film is moved exclusively by an intermittently feeding means, without the aid of auxiliary winding devices located in advance and in the rear of said means respectively, the customary winding-on and winding-off spools or rolls being located in a suitable holder.

In apparatus of this type there occur frequently irregularities or disturbances in the travel of the film, which become disagreeably perceptible by failure of the film to remain perfectly stationary during exposure. This defect is due to the fact that owing to the absence of the auxiliary winding devices referred to above, and of a film loop or bight between the spools or rolls and the point at which the feeding force is applied, the pull of the feeding means is transmitted by the film directly to the winding-off spool.

Since the mass of such spool is relatively considerable, this acceleration has the drawback of placing a very great strain on the feed perforations of the film, as the film is called upon to transmit the power required for accelerating the winding-off spool. Furthermore, the winding-off spool, by its momentum, continues to rotate after the pull of the feeding means has ceased, so that the length of film wound off said spool will be greater than the length fed past the window or gate during such pull. As a result, the film is pushed or crowded into the film-guiding channel by the continued rotation of such spool, and this in turn causes a failure of the film to remain stationary during exposure, particularly if the apparatus has no stopping or holding gripper or claw.

Attempts have been made to avoid these drawbacks by omitting entirely the stationary guide channel usually provided between the winding-off spool and the point at which the feeding force is applied, a spring being employed in connection with such attempts, for the purpose of producing a loop-like lengthening of the film path at this portion. This expedient is not satisfactory, for the reason that the provision of the spring requires the film holder to be enlarged, and that the addition of this auxiliary element increases the cost of the holder.

The difficulties explained above are overcome, according to our invention, by so constructing the members which serve to guide the film on its way to and from the film gate or window (that is to say, between said window and the winding-off and winding-on spools respectively) that such members will modify the path of the film in such a manner as to alter the length of the film portion lying between the film gate and the respective spools.

A satisfactory and very simple example of a construction embodying our present invention is illustrated by the accompanying drawing in plan view, partly in section.

The film holder shown comprises a casing 1 of substantially rectangular shape, the cover of which has been omitted from the drawing. At 2 we have indicated the shaft with which the winding-off or film supply spool or feed roll 3 is connected (detachably) in any well-known or approved manner, said shaft being journaled in the casing 1. A second shaft 4, operatively connected with the usual spring motor of the apparatus (not shown) and driven by such motor, extends into the interior of the holder through an opening in the holder bottom. This second shaft 4 serves to drive the winding-on spool or take-up roll 5. The film passes from the spool or roll 3 through a guide channel 6 to the film gate or window 7, where the exposure is made and where the film is engaged by the usual feeding claw 7ª or equivalent means for advancing it, through another guide channel 8, toward the winding-on or take-up spool 5. The two channels 6 and 8 are formed between a wall of the holder on one side, and on the other side by curved plate springs 9 (which may be made of one piece of metal), one end of each spring being secured rigidly to the holder bottom, as indicated at 10 to constitute a fixed guide channel, while the other end of the spring constitutes a continuation of said fixed guide channel and is adjacent to the spool 3 or 5 respectively, the elasticity of the spring tending to make it move outwardly, that is to say, away from the respective film spool or roll.

When a pull is exerted on the film by the feeding claw or equivalent means, at the window or gate 7, in the direction of the arrow, the result is first to bend or flex the left-hand spring 9 toward the winding-off spool 3, as indicated by dotted lines, thereby enabling the film portion between the point of feed and the said spool to be shortened without transmitting the pull to the said spool. The left-hand spring 9 is thus put under tension, and when the pull exerted by the feeding device ceases, the spring by its elasticity resumes the normal position indicated by full lines, and during its outward movement draws a corresponding length of film from the winding-off spool or feed roll 3. Thus, without using any additional part, and while preserving a proper guidance for the film, we avoid any excessive strains on the film at the feed perforations thereof and all jerky action on the film at the gate 7.

The spring 9 adjacent to the channel 8 operates in a manner similar to that described above, but out of step with the other spring 9. In other words, the right-hand spring 9 is flexed inwardly and therefore placed under tension, during the interval that the film is stationary, and returns, by its elasticity, to the normal relaxed position, during the feed movement of the film. During the time that the film is stationary, the winding-on spool or take-up roll 5, which is driven permanently by the spring motor or equivalent mechanism, exerts a pull on the film and thereby bends the right-hand spring inwardly, shortening the film portion between the film gate 7 and the periphery of the film coil on said spool. When thereupon during the next feed movement of the film the length of the film portion between said points is increased, the right-hand spring 9 is permitted to swing back outwardly to its original position by its elasticity. It will therefore be understood that like movements of the two springs alternate, the inward or tensioning movement of one spring co-inciding in time with the outward or relaxing movement of the other spring. The inward movement of a spring corresponds to the shortening of the film portion engaged by such spring, while the outward movement of a spring corresponds to a lengthening of the respective film portion.

Our invention enables us to dispense with the use of stopping or holding mechanism in conjunction with the feed device, and also with the use of auxiliary winding devices located in advance and in the rear of said feed device respectively.

While intended primarily for motion picture cameras, our invention is also applicable to motion picture projectors.

Various modifications may be made without departing from the nature of our invention as set forth in the appended claims.

We claim:

1. In a film holder for motion picture apparatus including a film gate, a guide channel through which the film is moved to said gate by intermittently actuated feeding means, a winding-off spool and a winding-on spool, that improvement, which comprises a resilient member forming a continuation of the inner wall of said guide channel, said member being rigidly fastened in position at the end toward said film-gate and being free at the end toward one of said spools, and being adapted to coincidentally guide the film and to alternately shorten and lengthen successive portions of the film between the guide channel and one of said two spools.

2. In a film holder for motion picture apparatus including a film gate, a guide channel through which the film is moved to said gate by intermittently actuated feeding means, a winding-off spool and a winding-on spool, that improvement, which comprises a resilient member located between the guide channel and the winding-on spool and a second resilient member located between the guide channel and the winding-off spool, each of said members forming a continuation of the inner wall of the guide channel, and being rigidly fastened in position at the end towards said film-gate and being free towards the end to one of said spools, each of said members being adapted to coincidentally guide the film and to alternately shorten and lengthen successive portions of the film between the guide channel and one of said two spools.

3. In a film magazine, the combination of a take-up spool on which film is to be wound, a gate-plate past which the film is to be fed before it reaches the take-up spool, a plate extending from the adjacent end of the gate-plate to a point near the take-up spool, said plate lying closely adjacent the wall of the magazine and forming a passage along which the film passes, the end of the latter plate adjacent the take-up spool being of a predetermined flexibility, the film passing over this flexible end and being automatically maintained in a state of uniform tension as it is wound up on the take-up spool.

4. In a removable film magazine for amateur motion picture cameras, a magazine casing adapted to be removably inserted in a camera, a film supply reel and a film take-up reel disposed within the casing, a gate plate in the casing and disposed adjacent one wall thereof, the film being adapted to pass from the supply reel to and past the gate plate and thence to the take-up reel, a plate disposed between the gate and the take-up reel and lying closely adjacent a wall of the casing to guide the film, and flexible means disposed between said plate and the take-up reel to bear against the film and maintain an even tension therein.

5. In a film magazine for amateur motion picture cameras, a magazine casing adapted to be removably inserted into a camera, a film supply reel and a film take-up reel disposed within the casing, means mounted in the casing and disposed adjacent one wall thereof for guiding the film past an opening in the casing at which the film is exposed as it passes from the supply spool to the take-up spool, and means of predetermined resiliency mounted in the casing and forming a continuation of said guiding means in the direction of travel of the film to the take-up spool and operatively engaging the film as it passes between the exposure opening and the take-up spool for automatically maintaining said film in a state of uniform tension.

6. In a film magazine having an opening therein at which the film is exposed, the combination of a supply spool, a take-up spool, means mounted in the magazine for guiding the film as it passes from the supply spool to the take-up spool past the exposure opening, at least a part of said guiding means being rigid with respect to the magazine and being disposed adjacent a wall thereof, and at least one other part of said guiding means in the path of the film from spool to spool being of predetermined resiliency and operatively engaging that section of the film between the exposure opening and a spool for automatically maintaining said film in a state of uniform tension.

7. In a film magazine having an opening therein at which the film is exposed, the combination of a supply spool, a take-up spool, means mounted in the magazine for guiding the film as it passes from the supply spool to the take-up spool and past said exposure opening, the part of said guiding means in the vicinity of the exposure opening being stationary with respect to the magazine, said guiding means also having a part extending toward the supply spool in the line of said film, the end of said last-named part being disposed adjacent the supply spool and being of predetermined resiliency and operatively engaging the film relatively adjacent the supply spool for maintaining the film automatically in a state of uniform tension.

8. In a film magazine for a film handling apparatus, a supply spool mounted in the magazine for rotation, a take-up spool mounted in the magazine and adapted to be continuously driven, a guide mounted in the magazine adjacent the wall thereof for directing the film as it is intermittently moved past an opening in the magazine at which the film is exposed as it passes from the supply spool to the take-up spool, and a guide channel disposed between said guide and said take-up spool and cooperating with said guide to direct the film toward the take-up spool, said guide channel including film tensioning means in the line of said channel and the path of said film to the take-up spool and engaging said film and cooperating therewith for preventing the take-up spool from drawing the film from said channel faster than the film is intermittently advanced into said guiding channel.

9. In a film magazine for a film handling apparatus, a supply spool mounted in the magazine for rotation, a take-up spool mounted in the magazine and adapted to be continuously driven, a guide mounted in the magazine adjacent the wall thereof having an opening at which the film is exposed for directing the film as it is intermittently moved past said opening, said guide extending toward said take-up spool in the path of the film, and film tensioning means disposed between the end of said guide toward the take-up spool and the take-up spool in the path of the film and engaging the same and cooperating therewith for preventing the take-up spool from drawing the film from said guide faster than the film is intermittently advanced from said guide.

KURT MORSBACH.
KURT RASCHKE.